No. 611,296. Patented Sept. 27, 1898.
G. TURNER & J. M. H. VENOUR.
PNEUMATIC TIRE.
(Application filed Apr. 15, 1898.)
(No Model.)

UNITED STATES PATENT OFFICE.

GEORGE TURNER AND JAMES MALCOLM HAMILTON VENOUR, OF LONDON, ENGLAND.

PNEUMATIC TIRE.

SPECIFICATION forming part of Letters Patent No. 611,296, dated September 27, 1898.

Application filed April 15, 1898. Serial No. 677,699. (No model.)

*To all whom it may concern:*

Be it known that we, GEORGE TURNER and JAMES MALCOLM HAMILTON VENOUR, cycle manufacturers, subjects of Her Majesty the Queen of Great Britain, residing at 149 New Kent road, London, S. E., England, have invented certain new and useful Improvements in Pneumatic Tires, (for which we have applied for patent in Great Britain, No. 28,903, dated December 7, 1897,) of which the following is a specification.

Our invention relates to an improved pneumatic tire for velocipede and other vehicle wheels and adapted to be easily fixed in position upon the rim of the wheel and be there retained by the mere inflation by air or gas only, without the employment of a separate or inner tube or chamber for containing the said air or gas.

Our improved tire may be adapted for use with almost any form of wheel-rim which is concave upon its outer surface and has edges that are curved or curled inwardly, and in order that our said invention may be clearly understood we have hereunto appended a sheet of drawings, of which—

Figure 1:
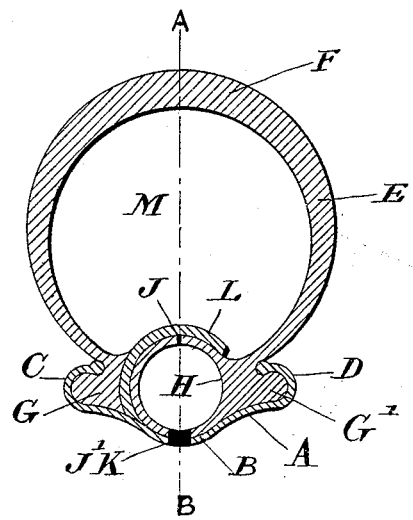
Figure 2:
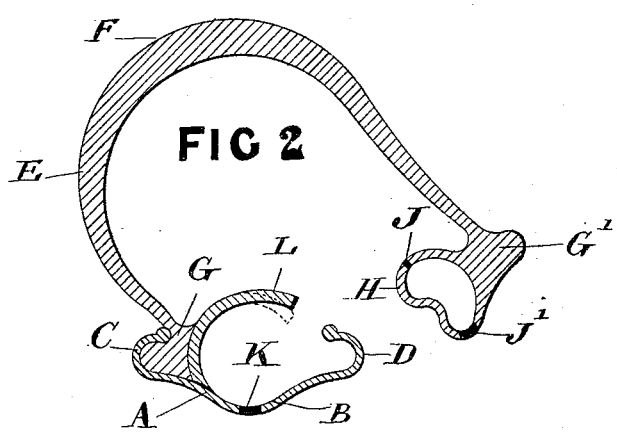
Figure 3:
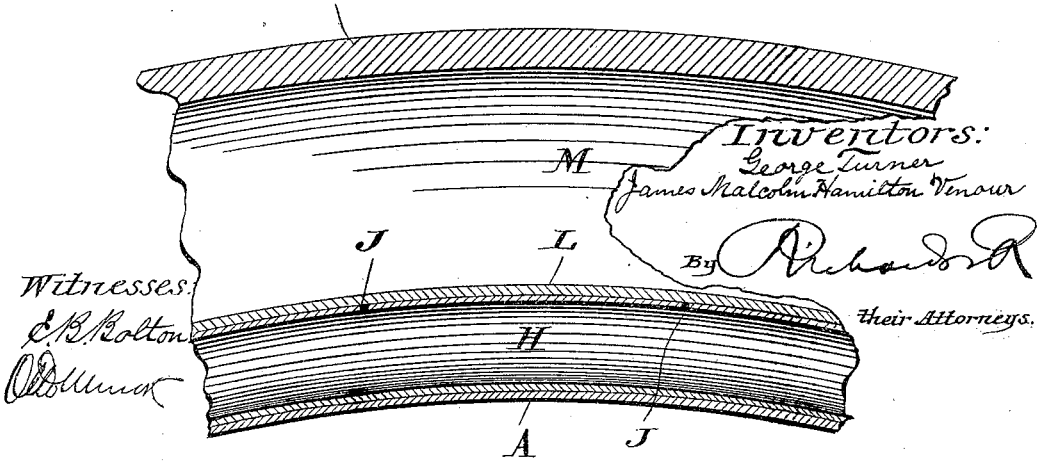

Figure 1 is a cross-sectional view of our improved tire in a state of inflation and mounted upon a wheel-rim of the shape and configuration in cross-section previously mentioned or substantially such as we find most suitable for the purposes of our invention. Fig. 2 is a like view of same as it would appear when deflated and in the act of being placed upon or removed from the said rim. Fig. 3 is a longitudinal section of the same, taken upon the line A B of Fig. 1.

Referring to the drawings, the form of concave rim we prefer to employ is shown by the reference-letter A, the same having a slight central dip at B and incurved or curled edges C and D.

Our improved tire E we construct of the usual or suitable material or materials, having an inner lining of canvas or other suitable and similar fabric and with the wearing-surface or tread portion F of greater thickness in the usual way, the outer surface of the said portion F being formed in any of the well-known ways for the prevention of side or back slip or both.

The edges G and G' of the tire are extended in substance and may be attached or integral, as desired, these being preferably of more highly vulcanized rubber or rubber composition than the remainder of the tire and so formed in cross-section that the one, G, may fit when seated within the curve or curl C and the other, G', the curve or curl D of the rim A, the latter edge G' having cemented thereto or molded or otherwise formed integrally therewith for the whole of its length an endless tube or air-chamber H, with or without being lined with canvas or similar non-extensible material, the said tube being of rubber of lesser density or such as has been subjected to a lesser degree of vulcanization, so as to be more elastic and capable of expansion when inflated, in order that this when so inflated may serve to press the edges G and G' firmly within and in air-tight connection with the curves or curls C and D of the rim and so serve to retain the tire upon the wheel, as at Fig. 1, the said tube or chamber H being provided with any number of small or pin holes J and a hole or holes J', the latter for receiving any suitable form of charging and discharging valve or valves passing through a hole or holes K in the rim A in the usual manner.

The swelled edge G of the tire has cemented or otherwise connected thereto for the whole of its length a flap L, of pure or nearly pure or slightly-vulcanized rubber, adapted to close down upon and cover the holes J in the tube or chamber H.

In fixing the tire upon the rim the edge G would be first placed in position within the curl or curve C of the rim, substantially as at Fig. 2, the opposite edge G' being then placed in position within the curl or curve D, the flap L being raised during the placing of G' to allow the tube H to be under this, the said flap eventually lying down upon H, covering the holes J. The air would then be pumped into the chamber H through the valve or valves in the holes K, and when the air in H had reached a certain pressure this would exude through the holes J into the larger chamber M, formed by the tire E, and when the pressure of air in the chamber M equals or exceeds that in the chamber H the larger volume in M would press the flap L firmly down upon and close the holes J in H, notwithstanding which the pressure of air in H would still be sufficient to retain the edges G and G' firmly within the curves or curls C and D for retaining the tire upon the rim, substantially as at Fig. 1.

To remove the tire, the chamber H would be deflated, and the consequent collapse of this would allow the air in M to escape beneath the flap L, partly through the holes J and partly around H and between the latter and the curl or curve D, when punctures may be repaired by patches cemented upon the inner surface of E, after which the tire may be again fixed in position, as previously described.

Having now particularly described and ascertained the nature of our said invention and in what manner the same is to be performed, what we claim is—

A tubeless pneumatic tire having a tube H at one edge with openings J, J', the other edge of the tire having the flap L to fit over the opening J in the interior of the tire to act as a valve, substantially as described.

In witness whereof we have hereunto set our hands in presence of two witnesses.

GEORGE TURNER.
JAMES MALCOLM HAMILTON VENOUR.

Witnesses:
GEORGE THOMAS HYDE,
ALBERT GEORGE BARNES.